Nov. 9, 1965    G. W. BROWN ETAL    3,216,491
PLASTIC SHEET CONVEYING APPARATUS
Filed Oct. 28, 1963
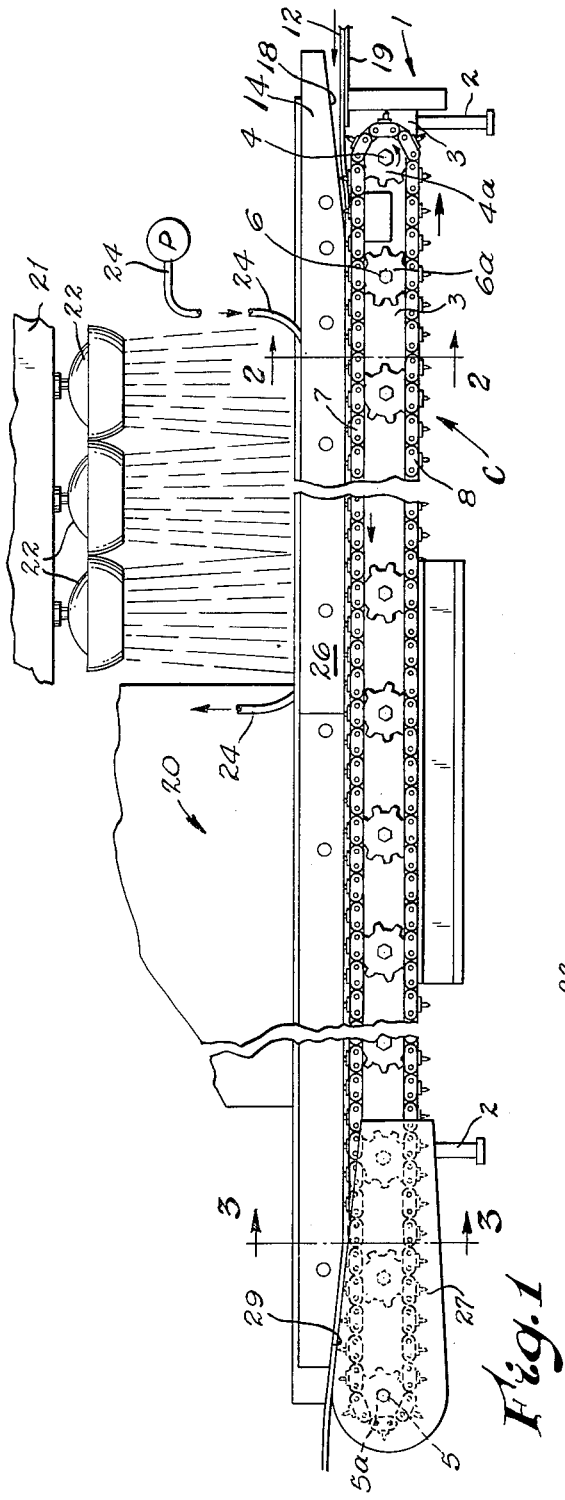
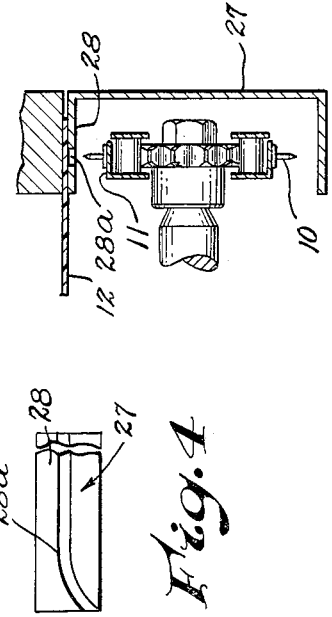
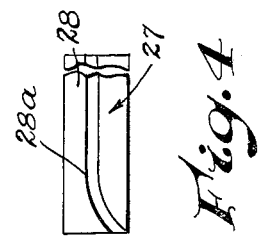
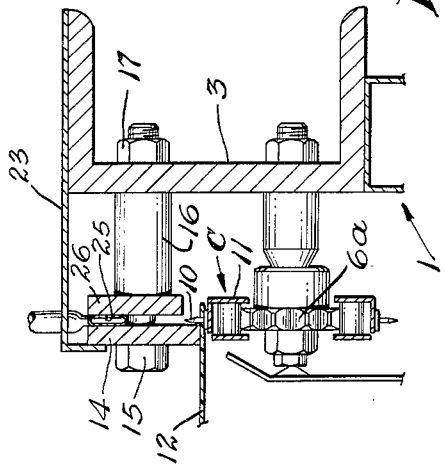
INVENTORS.
Gaylord W. Brown
Donald J. Rise
BY
Learman and McCulloch
ATTORNEYS United States Patent Office 3,216,491
Patented Nov. 9, 1965

3,216,491
PLASTIC SHEET CONVEYING APPARATUS
Gaylord W. Brown and Donald J. Rise, Beaverton, Mich., assignors to Brown Machine Company of Michigan, Inc., a corporation of Michigan
Filed Oct. 28, 1963, Ser. No. 319,192
9 Claims. (Cl. 165—61)

This invention relates to sheet conveying apparatus and more particularly to plastic sheet conveying apparatus for differential pressure forming machines for conveying a continuous thermoplastic plastic sheet from a roll or from a sheet extruding machine to and through a heating zone where the sheet is treated preparatory to its entering a molding or forming zone where parts are formed from the sheet. The invention is particularly concerned with the protection of the side edges of the conveyed sheet against overheating to such an extent as to interfere with the progress of the sheet through the heating and forming zones.

In the process of molding articles from plastic sheet stock, the sheet is advanced by a conveyor which normally grips the sheet at its opposite sides and conveys it toward a molding zone where forming apparatus is actuated to form the articles from the sheet. Preliminarily to being introduced to the molding zone, the sheet is passed through a heating zone to bring it to the proper temperature for forming and enable the molding operation. In order to prevent separation of the sheet from the conveying elements employed in the present invention, guide members are employed conjunctively with the conveying elements to engage the side edges of the sheet. These guide members, which must extend through the heating zone, tend to become overheated and raise the temperature of the edges of the sheet to such a degree that the conveying apparatus is incapable of properly advancing it.

An object of this invention is to provide sheet conveying apparatus of the kind described which is provided with means for preventing the overheating of those portions of a sheet that are engaged by the sheet advancing mechanism.

Another object of the invention is to provide sheet advancing apparatus having sheet guiding means and wherein the guiding means and the lateral edges of the sheet are shielded.

A further object of the invention is to provide apparatus of the character referred to and provided with means for cooling the sheet guiding means at the guided edges of the sheet.

Other objects and advantages of the invention will be pointed out specifically or will become apparent from the following description when it is considered in conjunction with the appended claims and the accompanying drawings, in which:

FIGURE 1 is a fragmentary, side elevational view of sheet conveying apparatus constructed in accordance with the invention;

FIGURE 2 is an enlarged sectional view of a portion of the apparatus and taken on the line 2—2 of FIGURE 1;

FIGURE 3 is a sectional view taken on the line 3—3 of FIGURE 1; and

FIGURE 4 is a fragmentary top plan view of one of the sheet separating guard members.

Apparatus constructed in accordance with the invention comprises a main frame 1 having supporting end sections 2 on which are supported a pair of parallel, spaced apart rails 3. Spanning the rails 3 are front and rear shafts 4 and 5 which mount sprockets 4a and 5a thereon. Also, a plurality of stub shafts 6 are mounted on the rails 3 intermediate the shafts 4 and 5 and on each is journaled a sprocket wheel 6a. Supported by the sprockets 4a, 5a, and 6a adjacent each frame rail 3 is a conveyor chain generally designated C having an upper run 7 and a return run 8. The pair of chains C may be driven from the shaft 5 in such direction as to cause the upper runs 7 to move from right to left, as viewed in FIGURE 1.

The chains C are provided with a plurality of pins 10, each of which is mounted on a carrier 11 that may be fixed to an individual link of the chain. The carriers 11 are so arranged that the pins 10 extend upwardly as they travel along the upper run 7 of the chains C.

Above each chain C is a guide bar 14 that is adapted to be engaged by an adjacent edge of the plastic sheet 12 so as to guide the latter in its movements along the frame. The guide bar 14 is mounted on the adjacent rail 3 by means of a bolt 15 that extends through a sleeve 16 and through an opening in the rail 3. The bolt 15 is secured by means of a nut 17. At the feeding end of the conveyor mechanism the guide 14 inclines downwardly as at 18 so as to guide the advancing sheet into engagement with the upwardly pointing pins 10 and secure penetration of the sheet by the pins. Thereafter, the sheet remains in guiding engagement with the lower surface of the guide bar 14.

The apparatus thus far described may be positioned at the discharge end of a sheet extruding machine (not shown) of conventional construction which functions to deliver a continuous sheet of thermoplastic material such as polystyrene, linear polyethylene, or the like, to a shelf 19 that may be supported on the frame 1 at the feeding end of the latter. The leading end of the sheet 12 may be extended between the parallel rails 3, whereupon the advancing sheet engaging pins 10 may pierce the opposite edges of the sheet 12 and advance the sheet toward the opposite end of the frame upon driving of the chains C.

The sheet 12 is adapted to be conveyed by the chains C to a molding zone at which is located a forming machine 20 which forms individual articles from the sheet 12. It has been the practice heretofore to apply heat to the sheet in advance of the latter's reaching the molding machine 20 so as to facilitate the molding process. Accordingly, apparatus constructed in accordance with the invention includes a preferably overhead support 21 on which is mounted a plurality of radiant heating devices 22 constituting a heating zone and arranged to apply heat to the sheet 12 just prior to the latter's introduction to the molding machine 20.

The application of heat to the sheet 12 at the heating zone renders the sheet deformable so as to enable the forming of articles from the sheet by the molding machine. Some of the heat applied to the sheet 12, however, is transmitted by conduction to the guide bars 14. In addition, heat radiating from the heating units 22 is absorbed by the guides 14. As a consequence, the guide bars 14 tend to become overheated and to unduly heat the edges of the sheet 12 adjacent the gripping pins 10. The undue softening of the edges of the sheet weakens the latter adjacent the pins 10 and the pins tend to tear the sheet so as to prevent proper advancement of the sheet.

Apparatus constructed in accordance with the invention includes means for cooling the guide bars 14 and comprises a heat shield 23 that may be bolted, welded, or otherwise suitably fixed to each rail 3 to overlie the adjacent guide 14 and shield the latter against direct radiation of heat from the heaters 22. The cooling apparatus also includes a tubular conduit 24 for each bar 14, formed of thin walled, high heat conductive material, such as copper, which is connected at one end to a pump P which pumps water or other coolant from a source through the conduit 24 and back to a drain.

As is best illustrated in FIGURE 2, each conduit 24 is squeezed together or pinched into substantially elliptical shape as at 25 so as to provide a relatively high area of contact between the conduit and the adjacent guide 14. The conduit is maintained in engagement with the guide 14 by means of a bar 26 supported on the bolt 15 and maintained in engagement with the conductor by the sleeve 16. While only the chain and its associated elements on one side edge of the plastic sheet has been shown, it is understood that the other chain for engaging the opposite side of the plastic sheet, and its associated elements, are identical.

In the operation of the apparatus thus far described, the sheet 12 is fed continuously to and through the heating zone where it is heated and then advanced to the molding zone. During the operation of the apparatus, coolant is pumped continuously through the conductors 24 so as to effect a heat exchange between the liquid and the guides 14 to cool the latter. The shields assist in maintaining the guides cool, thereby overcoming any tendency of the sheet to become overheated.

From the molding zone the sheet is advanced toward the opposite or discharge end of the machine. Adjacent the discharge end of the machine, each chain C is enclosed within a chain guard 27 having an upper flange 28 which overlies the adjacent chain. The flange 28 lies in the path of movement of the sheet 12 and is inclined upwardly to lift the sheet off the pins 10. To permit upward movement of the sheet relative to the pins 10, the guide bars 14 also are inclined upwardly as at 29 adjacent the discharge end of the machine. Following separation of the sheet from the advancing and conveying mechanism, the sheet proceeds to another processing zone for further treatment. Provided in the upper wall 28 of each guard 27 is a curvilinear slot 28a which leads out the discharge end of guard 27. These slots 28a provide passageways for slivers of plastic which get caught on the pins 10 and in effect cam these slivers to the discharge end of the machine so that they are not carried around with the chains once again and dropped on the shield for the heaters 22 disposed beneath the sheet (not shown) or do not interfere with the advancing operation.

This disclosure is representative of presently preferred methods and apparatus according to the invention, but is intended to be illustrative rather than definitive thereof. The invention is defined in the claims.

What is claimed is:

1. Thermoplastic sheet conveying apparatus comprising frame means; a pair of substantially parallel, spaced apart endless conveyors supported on said frame means for conveying a generally longitudinally disposed sheet to and through a heating zone; means on said conveyors for gripping opposite edges of said sheet; juxtaposed heating means mounted at said zone a spaced vertical distance from said sheet for heating a sheet passing therethrough; a pair of guide means supported by said frame means at said zone, one adjacent each of said conveyors in juxtaposed relation with the edge of each sheet and being engageable with the adjacent edge of said sheet for guiding the latter through said zone; and tubular coolant conducting means through which a coolant is circulated supported by said frame means at said zone and having a generally flat side in engagement with each of said guide means for cooling the latter.

2. The apparatus set forth in claim 1 wherein said tubular conducting means comprises a thin-walled pipe formed of material having high heat conducting properties.

3. Sheet conveying apparatus comprising a frame; a pair of parallel, spaced apart, endless driven chain conveyors mounted on said frame; plastic sheet piercing means supported on said conveyors for piercing opposite sides of a sheet to convey the latter along said frame to and through a heating zone; heating means mounted at said zone for heating said sheet; guide means supported by said frame at each side thereof and engageable with the opposite edges of said sheet to guide the latter; and means at the discharge ends of said conveyors for removing slivers of plastic from said piercing means.

4. The combination defined in claim 3 in which said latter means comprises inclined separating flange portions for lifting said sheet having outwardly extending camming slots therein leading to the discharge ends of said flange portions.

5. Thermoplastic sheet conveying apparatus comprising frame means; a pair of substantially parallel, spaced apart longitudinally disposed, endless conveyors supported on said frame means for conveying a generally longitudinally disposed sheet to and through a heating zone; spaced apart piercing means carried on said conveyors for gripping opposite edges of said sheet and transporting it longitudinally; overhead heating lamp means mounted at said zone a spaced vertical distance from said sheet for heating a sheet passing therethrough; a pair of longitudinally disposed guide rail means for said piercing means supported by said frame means along the path of travel of said piercing means, one adjacent each of said conveyors and each having its lower edge surface in juxtaposed relation with the edge of each sheet and being engageable with the adjacent edge of said sheet for guiding the latter through said zone; and longitudinally extending tubular coolant conducting means through which a coolant is circulated supported by said frame means at said zone and having a generally flat side in engagement with each outer side surface of said guide rail means for cooling the latter.

6. Thermoplastic sheet conveying apparatus comprising frame means; longitudinally disposed endless conveyor means supported on said frame means for conveying a generally longitudinally disposed sheet to and through a heating zone; sheet gripping means carried on said conveyor means for gripping at least one edge of said sheet and transporting it longitudinally; overhead heating means mounted at said zone a spaced vertical distance from said sheet for heating a sheet passing therethrough; guide means supported by said frame means at said zone adjacent said conveyor means and in juxtaposed relation with said edge of the sheet, said guide means being engageable with the upper surface of said edge of said sheet for guiding the latter through said zone and incorporating longitudinally extending tubular coolant conducting means through which a coolant is circulated supported by said frame means at said zone in engagement with said guide means for cooling the latter; and generally horizontally disposed shield means supported by said frame means above said coolant conducting means.

7. Thermoplastic sheet conveying apparatus comprising frame means; a pair of substantially parallel, spaced apart longitudinally disposed endless conveyors supported on said frame means for conveying a generally longitudinally disposed sheet to and through a heating zone; spaced apart piercing means carried on said conveyors for gripping opposite edges of said sheet and transporting it longitudinally; overhead heating lamp means mounted at said zone a spaced vertical distance from said sheet for heating a sheet passing therethrough; a pair of longitudinally disposed inner guide rails supported by said frame means along the path of travel of said piercing means, one adjacent each of said conveyors and each having its lower edge in juxtaposed relation with the edge of each sheet and being engageable with the adjacent edge of said sheet for guiding the latter through said zone; outer rails opposite each of said inner guide rails; longitudinally extending, thin walled, tubular coolant conducting means through which a coolant is circulated supported by said frame means at said zone and having generally flat sides in sandwiched engagement between said inner and outer rails for cooling the latter;

and shield means supported by said frame means above said coolant connecting means in the path of heat waves from said lamp means to shield said coolant conducting means therefrom.

8. Thermoplastic sheet conveying apparatus comprising frame means; longitudinally disposed conveyor means supported on said frame means for conveying a generally longitudinally disposed sheet to and through a heating zone; sheet piercing means carried on said conveyor means for gripping said sheet and transporting it longitudinally; juxtaposed heating means mounted at said zone a spaced vertical distance from said sheet for heating a sheet passing therethrough; guide rail means for said piercing means and sheet supported by said frame means in the generally horizontal plane of and along the path of travel of said piercing means and in juxtaposed relation with said edge of the sheet, said guide means being engageable with the upper surface of said edge of said sheet for guiding the latter through said zone; and means for circulating a coolant medium to cool said guide means.

9. Thermoplastic sheet conveying apparatus for a longitudinally extending sheet comprising frame means; conveyor means disposed longitudinally relative to said sheet supported on said frame means for conveying said sheet having side surfaces connected by longitudinally extending edge surfaces at the edges of said sheet to and through a heating zone; sheet piercing means carried on said conveyor means for gripping at least one edge of said sheet and transporting said sheet longitudinally; heating means mounted at said zone for heating a sheet passing therethrough; guide rail means for said piercing means and sheet supported by said frame means in substantially the plane of and along the path of travel of said piercing means and in juxtaposed relation with said one edge of the sheet, said guide means being engageable with a side surface of said sheet for guiding the latter through said zone; and means for circulating a coolant medium to cool said guide means.

References Cited by the Examiner
UNITED STATES PATENTS

| | | | |
|---|---|---|---|
| 790,302 | 5/05 | Jones et al. | 165—120 X |
| 2,732,631 | 1/56 | Black | 34—326 X |
| 2,755,506 | 7/56 | Weber | 165—61 X |

ROBERT A. O'LEARY, *Primary Examiner.*

CHARLES SUKALO, *Examiner.*